H. VARBLE.
SPRING WHEEL.
APPLICATION FILED JUNE 24, 1918.
1,285,480.
Patented Nov. 19, 1918.
2 SHEETS—SHEET 1.
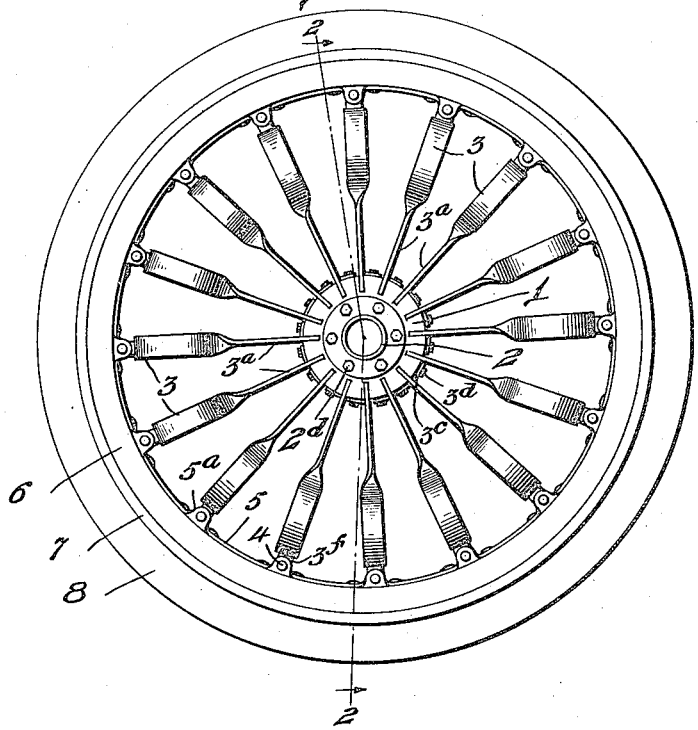
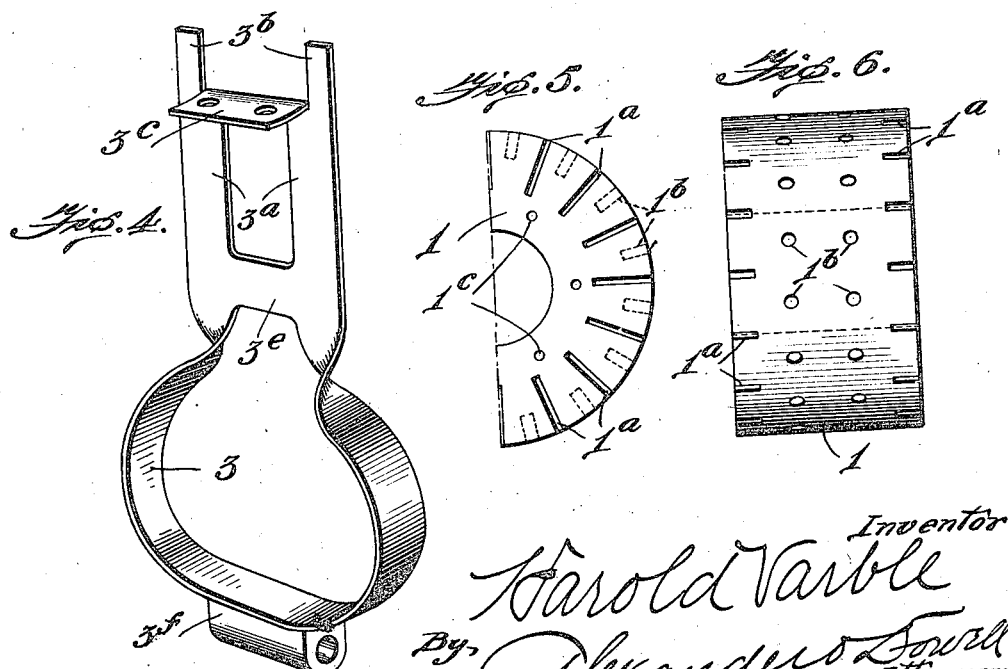

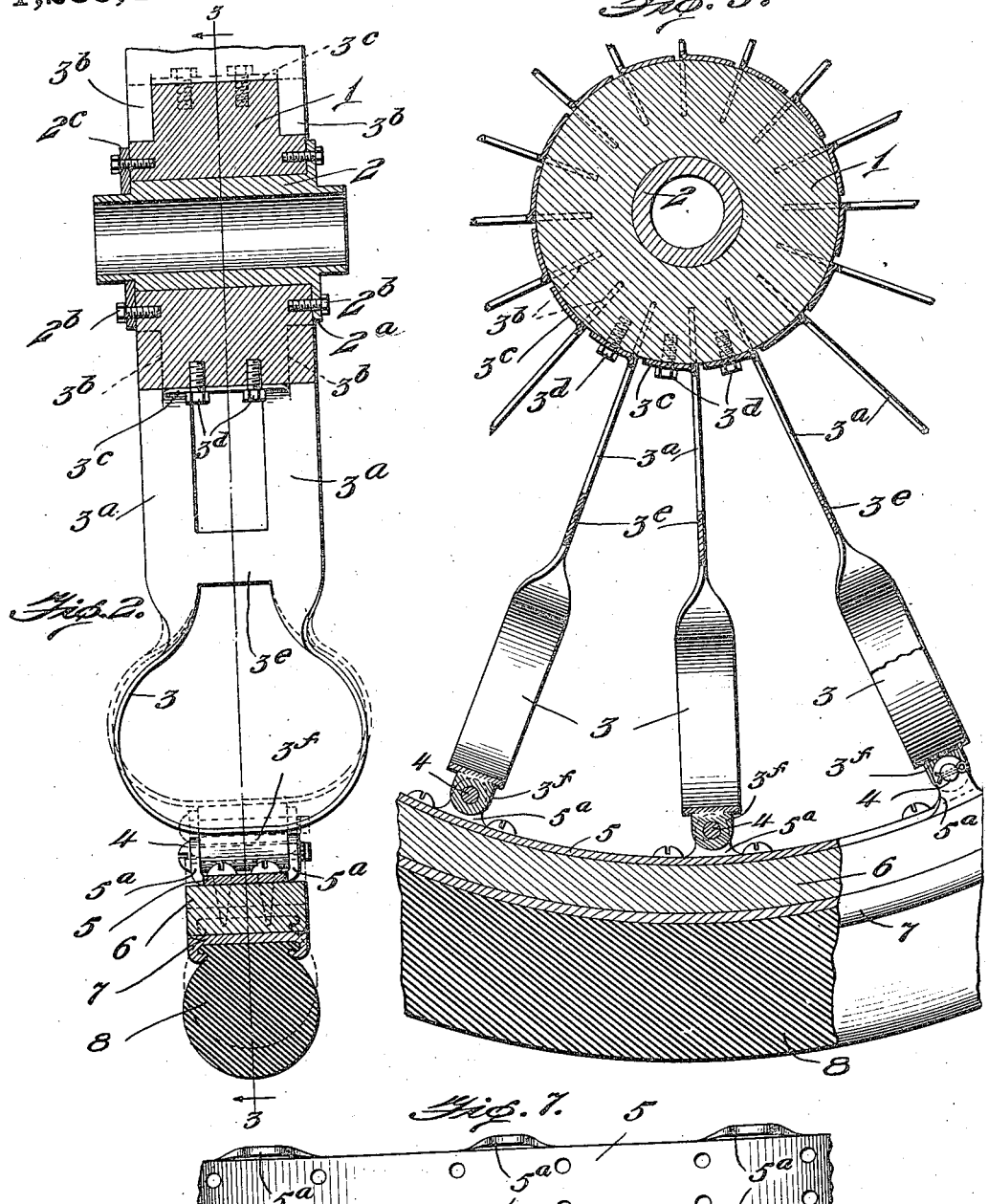

UNITED STATES PATENT OFFICE.

HAROLD VARBLE, OF EL MONTE, CALIFORNIA.

SPRING-WHEEL.

1,285,480.

Specification of Letters Patent.   Patented Nov. 19, 1918.

Application filed June 24, 1918.   Serial No. 241,534.

*To all whom it may concern:*

Be it known that I, HAROLD VARBLE, a citizen of the United States, residing at El Monte, in the county of Los Angeles and State of California, have invented certain new and useful Improvements in Spring-Wheels; and I hereby declare that the following is a full, clear, and exact description thereof, reference being had to the accompanying drawings, which form part of this specification.

This invention is an improvement in so called "spring wheels" in which the hub is supported and centered within the rim or felly by means of resilient or spring spokes.

The objects of the present invention are to provide a spring wheel with novel spring-members or spokes; with novel means for attaching the spring members to the hub, and to the felly or rim; with a novel hub member; and with other minor novel details of construction; all of which will be hereinafter explained.

The accompanying drawings illustrate one, and at present the preferred, embodiment of the invention; and the following explanation thereof will enable others to adapt and use the same.

As various changes may be made in the forms and proportions of parts while retaining the essential features of the invention,—the essential features thereof and the novel constructions and combinations of parts for which I desire protection are set forth in the claims following the description.

In said drawings:

Figure 1 is a front view of the complete wheel.

Fig. 2 is an enlarged sectional view on line 2—2, Fig. 1.

Fig. 3 is a section on line 3—3 Fig. 2.

Fig. 4 is a perspective view of one of the spoke members detached.

Figs. 5 and 6 are detail end and side views of the hub member.

Fig. 7 is an enlarged detail view of the rim member.

The wheel, as shown, comprises a cylindric hub member 1 which is axially bored for the reception of a core or spindle 2, and is provided at or near its opposite ends with peripheral series of radially disposed slots $1^a$ for the reception of the ends of the spoke members; and intermediate the slots with threaded holes $1^b$ for the reception of spoke fastening screws.

The core 2 forms the axial part of the hub and is exteriorly fitted into the bore of the hub member, and may be secured thereto or even formed therewith if desired; and may be of any desired length; but is shown as separately formed and fitted therein, and as provided with a peripheral flange $2^a$ adapted to fit against one end of the hub member 1 and be fastened thereto by tap bolts $2^b$ engaging suitable threaded holes $1^c$ in the end of the hub member.

If desired this flange $2^b$ might be sufficiently large in diameter to cover the entire adjacent end of the hub member 1 and close the outer sides of the slots $1^a$ therein; and a like collar or plate $2^c$ might be attached to the other end of the hub member for a like purpose; but I do not consider such covering or finishing collars $2^a$, $2^c$ indispensable features of the invention.

As shown each spoke member is preferably formed of a flat steel band which is bent centrally to form an almost circular loop 3 from which extend parallel leg portions $3^a$. The loop 3 is outermost, and lies transversely of the wheel, with the width of the metal broadside to the face of the wheel.

The leg portions $3^a$ of each spoke member extend radially inward, but are twisted near their junction with the loop so that the metal thereof is edgewise to the face of the wheel and the ends of the leg portions $3^a$ are provided with extensions $3^b$ which are adapted to fit into the related slots $1^a$ at opposite ends of the hub member 1 and be fastened to the hub member. As shown, the ends $3^b$ are connected by a member $3^c$, which is either integral with or preferably welded to the members $3^a$, and is turned outwardly at substantially right angles to the members $3^a$ and shaped to fit the peripheral surface of the hub member, being fastened thereto by means of tap bolts $3^d$ engaging the threaded holes $1^b$ in the hub member. In this manner, the leg portions $3^a$ are prevented from separating and the spoke member is securely attached to the hub. Preferably, the spoke members are also united adjacent the loop 3 by cross bar $3^e$, which may be formed integral with or preferably welded to the members $3^a$.

It would be possible to stamp the spoke members out of sheet steel, but I prefer to make them out of bar or ribbon steel of the desired thickness and width, and then weld the parts $3^e$ and $3^c$ to the leg members $3^a$ after the loop member has been properly formed.

This construction affords a very durable and light spoke member, the leg members 3ª giving the wheel resiliency concentrically of the hub, and the loops 3 giving the wheel resiliency in the plane of the wheel so that the hub is cushioned or supported in a "floating" manner within the rim of the wheel.

The outer extremity of the spoke member, which is the central portion of the loop 3, is preferably pivotally connected with the rim or felly of the wheel. As shown, each loop 3 is provided with a block 3ᶠ fastened to its outer end as by welding it thereto, which block is transversely perforated for the passage of a bolt 4, which bolt transfixes flanges 5ª on opposite sides of a metal rim 5, which may be U-shaped in cross-section, but for lightness the flanges are shown as if cut away at points where the spokes are to be hingedly connected therewith. The blocks 3ᶠ are long enough to fit neatly between the opposite flanges 5ª, so that there will be no lateral play between the rim and the spoke members, and the bolts 4 may be secured by pins, or in any other desired manner, so as to hinge the spoke members to the rim 5.

To this rim 5 may be attached a wooden felly 6, and to this wooden felly, if desired, may be attached any suitable tire.

As shown, a metal clencher-rim 7 may be attached to the felly 6 and to this clencher rim a solid rubber tire 8 may be secured as indicated in the drawing.

The utility of the wheel and its operation may be readily understood by those familiar with spring wheels. It is seen that the spoke members are capable of yielding under vertical pressure and, because of their pivotal connection with the rim, they could also yield without undue strain. The spoke members directly below the hub will compress their loops under strain; the spoke members above the hub would elongate their loops under strain; and the spoke members at opposite sides of the hub could flex their leg portions 3ª, and also swing on their pivots 4; thus no part of the wheel offers any unyielding resistance and each spoke member will measurably contribute to maintain the hub in its proper axial position within the rim, or vice versa; and all the spoke members contribute to the support of the hub within the rim in a firm but yielding manner.

The stiffness or non-resiliency of the wheel is dependable upon the strength and number of the individual spoke members employed therein.

By reason of the construction shown, if any spoke member should be broken or injured it can be readily replaced without having to tear down the entire wheel.

What I claim is:

1. In a wheel, a hub; a felly; spoke members, each having an outer loop portion connected to the rim, and leg-portions extending from the inner ends of the loop portion and connected to the hub, said leg portions being twisted at right angles to the loop portion and a plate connecting the leg portions and fastened to the hub, substantially as described.

2. In a wheel, a felly, a hub having peripheral radial slots in its opposite ends; spring spoke members each having an outer loop portion connected to the rim, and leg portions extending from the inner ends of the loop portion and having their inner ends engaged with said slots in the hub; and a plate connecting the leg portions and projecting at an angle thereto and fastened to the hub, substantially as described.

3. For a spring wheel; a spoke member having a loop portion, leg members extending parallel from the ends of the loop, and a member connecting the leg portions near their inner ends and projecting substantially at right angles thereto and adapted to be fastened to the hub of the wheel.

In testimony that I claim the foregoing as my own, I affix my signature.

HAROLD VARBLE.